G. E. HOLMES.
FOOT SCRAPER.
APPLICATION FILED JAN. 31, 1912.
1,037,252.
Patented Sept. 3, 1912.
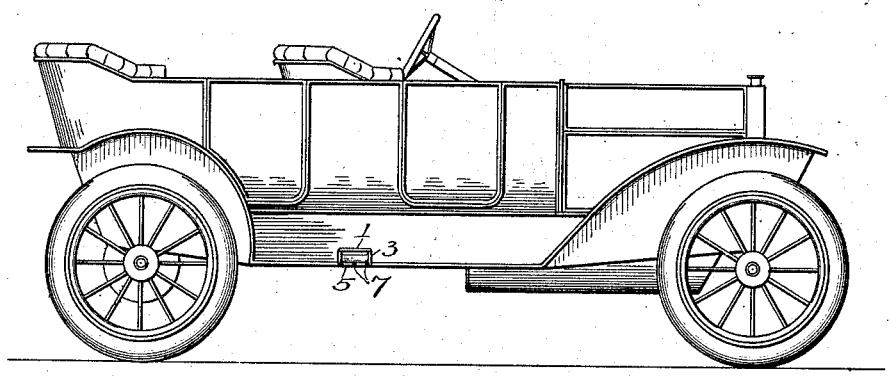
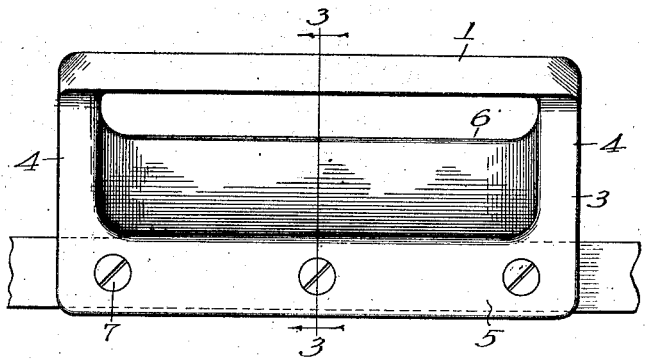
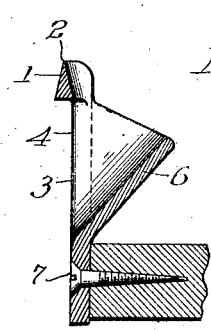
Witnesses:
Robert H. Weir
W. Terry Hahn
Inventor:
Glenn E. Holmes
By Jones, Addington, Ames & Seibold
Attys

UNITED STATES PATENT OFFICE.

GLENN E. HOLMES, OF CHICAGO, ILLINOIS.

FOOT-SCRAPER.

1,037,252.  Specification of Letters Patent.  Patented Sept. 3, 1912.

Application filed January 31, 1912. Serial No. 674,602.

*To all whom it may concern:*

Be it known that I, GLENN E. HOLMES, a citizen of the United States, residing at Chicago, in the county of Cook and State of Illinois, have invented new and useful Improvements in Foot-Scrapers, of which the following is a full, clear, concise, and exact description, reference being had to the accompanying drawing, forming a part of this specification.

My invention relates to improvements in foot scrapers and is particularly adaptable for foot scrapers for automobiles and the like.

One of the objects of my invention is to provide a device which may readily and easily be secured to the running board of an automobile and by the use of which passengers entering the automobile may remove the mud from their shoes before stepping into the car.

Another object of my invention is to provide a device of this character which, while it effectually removes the mud from the boots of passengers entering the car, will at the same time prevent the mud thus removed from accumulating on the running-board of the automobile.

For the purpose of disclosing my invention I have illustrated one embodiment thereof in the accompanying drawings.

In said drawings—Figure 1 is a side elevation of an automobile showing my foot scraper attached to the running-board thereof; Fig. 2 is an enlarged front elevation of the foot scraper; and, Fig. 3 is a transverse section taken on the line 3—3 of Fig. 2.

In the embodiment of my invention illustrated, the scraper comprises a scraper bar 1 which may have its upper edge tapered, as at 2, so as to effectually remove the mud from the boot, and a supporting frame 3 comprising the side members 4 and the bottom member 5. Extending inwardly from the supporting member I provide a mud deflector 6 which is inclined upwardly and inwardly from the bottom portion 5 so that as the mud is scraped off the boot by the scraper 2 it drops on this inclined deflector 6 and is thrown out into the roadway instead of being permitted to drop on the running-board.

In practice, I preferably construct the entire device from a single piece of metal, either by forming the same by casting or by stamping the device from sheet metal.

In Fig. 1 I have illustrated the scraper applied to the running-board of an automobile. In this figure it will be noted that the scraper is secured by means of screws 7 to the outer edge of the running-board, so that persons entering the same may scrape the mud off of their boots, and this mud, instead of falling onto the running-board, is thrown out into the road by the deflector 6.

Having thus described my invention, what I claim as new and desire to secure by Letters Patent, is:

1. As a new article of manufacture, a foot scraper arranged to be attached to the step of an automobile and project above the same, comprising in a single piece a substantially rectangular frame, the bottom of which serves as an attaching member for securing the scraper in position, and a deflector extending upwardly and rearwardly from the attaching member and having sides extending to the said members of the frame, the top of the frame being arranged to act as a scraper bar.

2. As a new article of manufacture, a foot scraper for automobiles arranged to be attached to the edge of the step and project upwardly therefrom, comprising in a single piece a deflector plate extending upwardly and forwardly from the edge of the step, having a substantially vertically extending attaching flange at its bottom to be secured to the edge of the step, side pieces for said plate, and a scraper bar extending across the front and top of said side pieces.

In witness whereof, I have hereunto subscribed my name in the presence of two witnesses.

GLENN E. HOLMES.

Witnesses:
W. PERRY HAHN,
MABEL REYNOLDS.

---

Copies of this patent may be obtained for five cents each, by addressing the "Commissioner of Patents, Washington, D. C."